(12) United States Patent
Sobti et al.

(10) Patent No.: US 9,342,114 B2
(45) Date of Patent: May 17, 2016

(54) END-USER PLATFORM HAVING AN INTEGRAL BASIN TO OPERATIONALLY AND PHYSICALLY RECEIVE A PORTABLE CELLULAR-TELEPHONY TRANSCEIVER

(75) Inventors: Arun Sobti, S. Barrington, IL (US); Darshana R. Panchal, S. Barrington, IL (US); Rejendra A. Panchal, S. Barrington, IL (US)

(73) Assignee: Arun Sobti & Associates, LLC, South Barrington, IL (US)

( * ) Notice: Subject to any disclaimer, the term of this patent is extended or adjusted under 35 U.S.C. 154(b) by 963 days.

(21) Appl. No.: 12/945,406

(22) Filed: Nov. 12, 2010

(65) Prior Publication Data

US 2011/0111796 A1     May 12, 2011

Related U.S. Application Data

(60) Provisional application No. 61/260,435, filed on Nov. 12, 2009.

(51) Int. Cl.
*G06F 1/16* (2006.01)
*H04M 1/04* (2006.01)

(52) U.S. Cl.
CPC ............ *G06F 1/1698* (2013.01); *G06F 1/1632* (2013.01); *G06F 1/1656* (2013.01); *H04M 1/04* (2013.01)

(58) Field of Classification Search
CPC ...... H04M 1/04; G06F 1/1632; G06F 1/1698; G06F 1/1656
USPC .................................. 455/556.1, 556.2, 557
See application file for complete search history.

(56) References Cited

U.S. PATENT DOCUMENTS

| | | | |
|---|---|---|---|
| 7,052,296 B2 | 5/2006 | Yang et al. | |
| 7,352,567 B2 | 4/2008 | Hotelling et al. | |
| 2002/0179406 A1 | 12/2002 | Fargo et al. | |
| 2004/0019724 A1* | 1/2004 | Singleton et al. | 710/303 |
| 2005/0185364 A1* | 8/2005 | Bell et al. | 361/679 |
| 2007/0035917 A1 | 2/2007 | Hotelling et al. | |
| 2007/0092080 A1* | 4/2007 | Lagnado et al. | 380/270 |
| 2007/0247794 A1* | 10/2007 | Jaffe et al. | 361/681 |
| 2008/0225006 A1* | 9/2008 | Ennadi | 345/171 |

(Continued)

FOREIGN PATENT DOCUMENTS

KR           200210656           1/2001

OTHER PUBLICATIONS

Story from BBC News; "Original Gadget to Debut at Cebit," Published: Mar. 3, 2006; http://news.bbc.co.uk/go/pr/fr/-/2/hi/technology/4771310.stm.

(Continued)

*Primary Examiner* — Dinh P Nguyen
(74) *Attorney, Agent, or Firm* — Fitch, Even, Tabin & Flannery LLP

(57) ABSTRACT

An apparatus comprises at least a first display, an end-user input interface, and a control circuit that operably couples to both this first display and this end-user input interface. The apparatus can further comprise a housing that houses these components. By one approach this housing also has a basin formed therein. This basin is of sufficient size to at least substantially fully receive a portable cellular-telephony transceiver (where, for example, this portable cellular-telephony transceiver has its own display and its own end-user input interface).

16 Claims, 3 Drawing Sheets

(56) References Cited

U.S. PATENT DOCUMENTS

2008/0273297 A1 11/2008 Kumar
2008/0304688 A1 12/2008 Kumar
2009/0059929 A1 3/2009 Lee

OTHER PUBLICATIONS

Prokaza, Julian; Microsoft Unveils Origami Experience 2.0 for UMPC—Broadband Genie; dated Jan. 8, 2008.
Palm Foleo: A Laptop for Your Smartphone; May 30, 2007; http://gizmodo.com/#!264550/palm-foleo-a-laptop-for-your-smartphone. Comment made by "Monty" to NPL3 directing to website http://neo-direct.com/intro.aspx dated May 30, 2007.
Melanson, Donald; Palm Foleo Announced; posted May 30, 2007; http://www.engadget.com/2007/05/30/palm-foleo-announced.
Staska; New iPhone Docking Station. Apple Tablet next?; Feb. 15, 2007; http://www.unwiredview.com/2007/02/15/new-iphone-docking-station-apple-tablet-next/.
Chubb, Peter; Apple MacBook Wheel: laptop with no keyboard; Jan. 6, 2009; http://www.product-reviews.net/2009/01/06/apple-macbook-wheel-laptop-with-no-keyboa.
Buchanan, Matt; Apple iPad Touch Tablet Mock-Up is Shiny, iPhone-y; Nov. 6, 2007; http://gizmodo.com/319299/apple-ipad-touch-tablet-mock+up-is-shiny-iphone+y.
International Search Report and Written Opinion of International Searching Authority from PCT/US2010/056568 Dated Jul. 29, 2011.

\* cited by examiner

END-USER PLATFORM HAVING AN INTEGRAL BASIN TO OPERATIONALLY AND PHYSICALLY RECEIVE A PORTABLE CELLULAR-TELEPHONY TRANSCEIVER

RELATED APPLICATION(S)

This application claims the benefit of U.S. Provisional application No. 61/260,435, filed Nov. 12, 2009, which is incorporated by reference in its entirety herein.

TECHNICAL FIELD

This invention relates generally to portable cellular-telephony devices and more particularly to peripheral components that operate in conjunction with such a device.

BACKGROUND

Portable cellular-telephony devices are known in the art. These include so-called smartphones that are often highly-capable portable computational platforms that offer features and functionality far beyond merely permitting the end user to conduct a wireless voice communication with another party. In fact, at present, the development of smartphone-specific applications represents an area of keen interest and great application of ingenuity and resources.

As a result, many end users of such devices rely greatly upon their devices for an increasingly diverse and growing number of services and capabilities (and harbor expectations for even more of the same going forward). That said, the form factor and size limitations of such devices presents a growing source of limitation and frustration for application designers, service providers, and end users. This is because the ultimate value and usability of a given application can be partially or wholly frustrated by the inherent limitations of such a device.

BRIEF DESCRIPTION OF THE DRAWINGS

The above needs are at least partially met through provision of the an end-user platform having an integral basin to operationally and physically receive a portable cellular-telephony device described in the following detailed description, particularly when studied in conjunction with the drawings, wherein.

Figure 1:
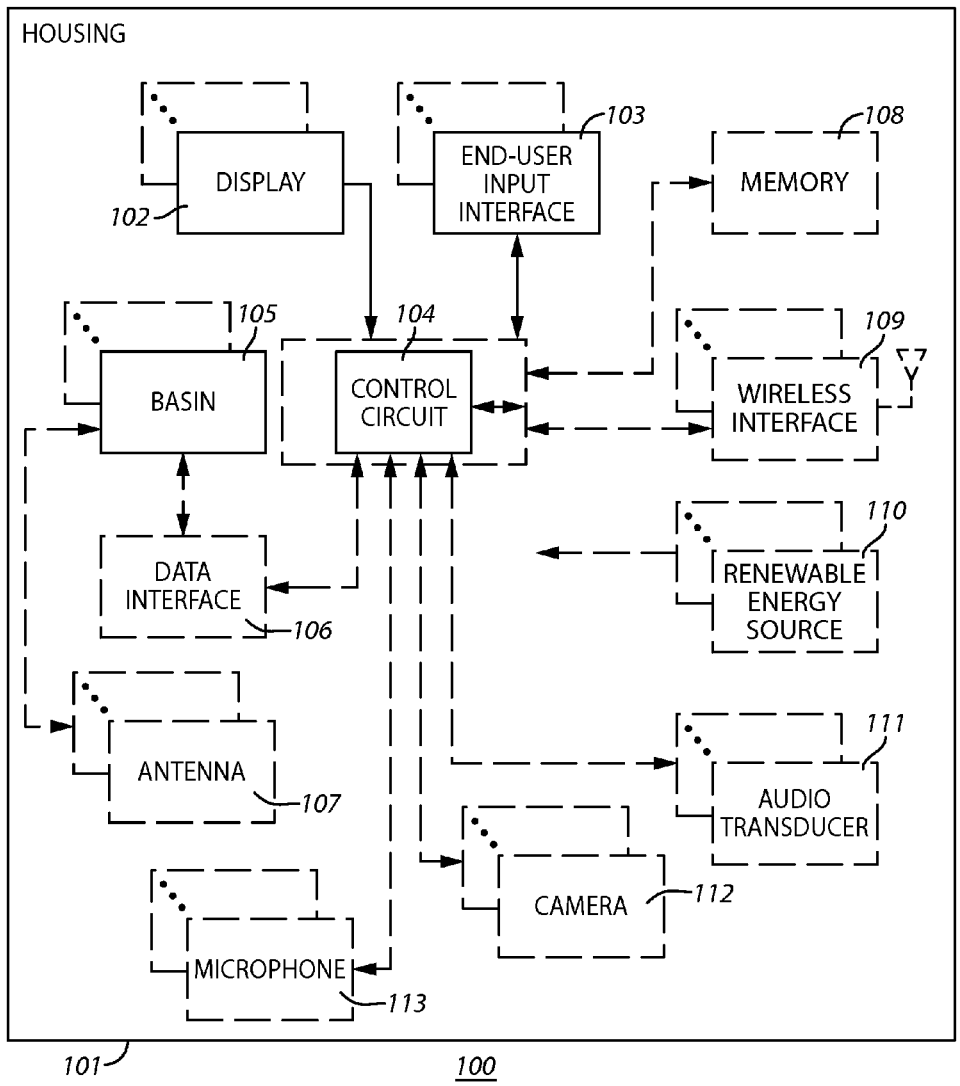
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an apparatus is provided that is of particular use in conjunction with a portable cellular-telephony transceiver of choice. This apparatus can comprise at least a first display, an end-user input interface, and a control circuit that operably couples to both this first display and this end-user input interface. The apparatus can further comprise a housing that houses these components. By one approach this housing also has a basin formed therein. This basin is of sufficient size to at least substantially fully receive a portable cellular-telephony transceiver (where, for example, this portable cellular-telephony transceiver has its own display and its own end-user input interface).

These teachings will accommodate a housing that assumes any of a wide variety of form factors. Examples in these regards include, but are not limited to, laptop computers, netbook computers, pad-styled computers, and so forth.

By one approach the basin is configured to snuggly receive and retain the portable cellular-telephony transceiver. This can comprise, for example, a basin that is configured to partially or fully automatically adjust (and to possibly resize) itself to snuggly retain the portable cellular-telephony transceiver within the basin.

By one approach this apparatus can further comprise a data interface that also couples to the aforementioned control circuit. This data interface (which can be wireless or non-wireless, as desired) can serve to carry data (including instructions, executable content, and user content (such as streaming content)) as between these components. By one approach, when the data interface comprises a non-wireless interface, this data interface is configured to be physically adjustable to thereby facilitate being operably coupled to any of a variety of different portable cellular-telephone transceivers.

So configured, these teachings can be readily employed to temporarily join a portable cellular-telephony transceiver with a corresponding platform that is able to support and/or enhance the operating capabilities and wherewithal of the portable cellular-telephony transceiver (and/or vice versa). These teachings are highly flexible in practice such that the particular operating capabilities that are supported and/or enhanced can be any of a wide variety. Examples include, but are certainly not limited to, rendering visual content on a larger display than is native to the portable cellular-telephony transceiver, rendering audio content with greater fidelity and/or volume than is native to the portable cellular-telephony transceiver, supplementing the computational capacity beyond that which is native to the portable cellular-telephony transceiver, and so forth.

These teachings are also highly scalable and can be employed in conjunction with a wide variety (and number) of portable cellular-telephony transceivers. These teachings are also sufficiently flexible to likely permit compatible accommodation of not-yet-developed portable cellular-telephony transceiver form-factors and data interfaces.

In practice, these teachings can serve to greatly leverage the present usability and capabilities of a given portable cellular-telephony transceiver. This, in turn, can lead to increased user satisfaction and an impetus to both hardware and software developers to push beyond the boundaries of what is presently considered a feasible application for such a platform.

These and other benefits may become clearer upon making a thorough review and study of the following detailed description. Referring now to the drawings, and in particular to FIG. 1, an illustrative apparatus 100 that is compatible with many of these teachings will now be presented.

This apparatus 100 includes a housing 101. As used herein, this word "housing" will be understood to refer to a container/covering for a plurality of related and integrated components and particularly to a container/covered that encompasses those components and facilitates to some extent their functionality and that is sized and configured to permit being readily carried about by an average-sized and able-bodied adult person. Accordingly, the word "housing" as used herein does not include things such as a suitcase, briefcase, backpack, or the like that serve as generic containers for whatever assorted items an end user of the thing might wish to include.

That said, these teachings will accommodate a fair amount of diversity in these regards. Examples of housings include, but are not limited to, laptop computer housings, netbook computer housings, pad-styled computer housings, and the like. Accordingly, it will also be understood that a "housing" can be comprised of two or more housings that are operably joined together. An example in these regards would include, for example, a clam-shell style of laptop where a first housing contains a display, a second housing contains a keyboard and corresponding control circuits, and the first and second housings are physically and electrically coupled to one another to yield a single integrated end-user platform "housing."

This housing 101 in turns serves to house a number of other components. These include, for example, a first display 102, an end-user input interface 103, and a control circuit 104. The first display 102 can comprise a monochromatic or a full-color display as desired and similarly can comprise a 2-dimensional or a 3-dimensional display as desired. By one approach this first display 102 can comprise a touch-screen display and hence can also serve, at least in part, as an end-user input interface as well. These teachings will also accommodate, as desired, having more than one such display 102. In such a case the various displays can vary as desired with respect to their size, operating characteristics, and their enabling technology. Generally speaking, this first display 102 is disposed such that its display surface is more or less planar with at least some surrounding portions of the housing 101.

Generally speaking this first display 102 serves to provide visually-based content to an end user of the apparatus 100. This can include text, still-graphic content, animated/video content, and so forth.

The end-user input interface 103, in turn, generally serves to permit an end user to input information, instructions, and so forth. This can include, for example, a cursor-control mechanism for controlling a cursor as appears on the aforementioned first display 102 and for selecting items that are highlighted or otherwise denoted by that cursor. Examples in these regards include, but are not limited to, touch pads, joysticks and so-called hot buttons, arrow keys, track balls, and so forth. This end-user input interface 103 can also comprise, for example, a keypad and/or a keyboard. The keyboard can comprise, for example, a standard QWERTY-style alphanumeric-character keyboard. Such a keyboard can comprise a mechanical keyboard or can, if desired, comprise a virtual keyboard (when, for example, the end-user input interface 103 includes a touch screen display).

In this illustrative example the first display 102 and the end-user input interface 103 both operably couple to a control circuit 104. Such a control circuit 104 can comprise a fixed-purpose hard-wired platform or can comprise a partially or wholly programmable platform (such as, but not limited to, one or more microcontrollers or microprocessors). These architectural options are well known and understood in the art and require no further description here. Generally speaking, this control circuit 104 can be configured to carry out the control and use of the various components described herein and also for appropriately interacting with the portable cellular-telephony transceiver as described below.

With continued reference to FIG. 1, the housing 101 has formed therein a basin 105. This basin 105 can be located where desired. By one approach this basin 105 is formed on a same side of the housing 101 as the first display 102. By another approach, either in lieu of the foregoing or in combination therewith, this basin 105 is formed on an exterior side of the housing 101 that is opposite that display 102.

This basin 105 is of sufficient size to at least substantially fully receive a portable cellular-telephony transceiver therein. For example, this can comprise having at least eighty percent of the portable cellular-telephony transceiver disposed within the basin 105. As another example, this can comprise having at least ninety percent of the portable cellular-telephony transceiver disposed within the basin 105. As yet another example, this can comprise having the entirety of the portable cellular-telephony transceiver disposed within the basin 105. Depending upon the application setting, of course, this can comprise having the portable cellular-telephony transceiver placed within the basin 105 with its own integral display facing outwardly, or inwardly, as desired.

Figure 2:
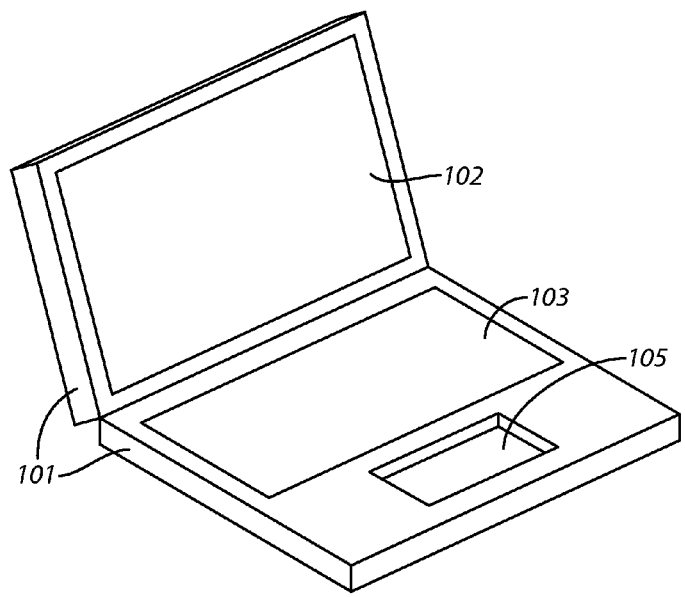
FIG. 2 comprises a perspective schematic view as configured in accordance with various embodiments of the invention.

FIG. 2 provides an illustrative example in these regards. Here, the housing 101 has the form factor of a clamshell-style laptop computer having a display 102 and an end-user input interface 103 (such as a virtual or mechanical keyboard). In this example the basin 105 is disposed below the end-user input interface 103 in an area often associated on many laptop computers with a touch pad-based cursor controller. As suggested above, of course, this basin 105 can be located in other locations as desired. These teachings will also readily accommodate including two or more such basins (that are either identical to one another or that are different with respect to one or more parameters of interest).

By one approach this basin 105 is configured to snuggly receive and retain the portable cellular-telephony transceiver of choice. This might comprise placing a resilient material of choice (such as a deformable plastic or foam element) along one or more interior edges of the basin 105. So configured, the end user can dispose a portable cellular-telephony transceiver within the basin by hand by compressing that resilient material when inserting the transceiver and allowing the resilient material to then retain the transceiver in place through compression and friction. (As another approach this basin 105 can be configured with one or more adjustable components to achieve a similar result. Further details in this regard will be provided below.)

By one approach, and referring again to FIG. 1, this apparatus 100 can further comprise a data interface 106. This data interface 106 can operably couple to the aforementioned control circuit 104 and can be configured to also operably couple to a portable cellular-telephony transceiver that is retained within the basin 105. So configured, this data interface 106 can thereby carry data between the control circuit 104 and the portable cellular-telephony transceiver. By one approach this data interface 106 can comprise, in whole or in part, a wireless interface (such as, but not limited to, a Bluetooth-compatible interface).

By another approach, in lieu of the foregoing or in combination therewith, this data interface 106 can comprise a non-wireless interface. In this case, the data interface 106 will typically comprise a plurality of electrical conductors that interact, for example, with the electrical conductors in a corresponding socket in the portable cellular-telephony transceiver.

Figure 3:
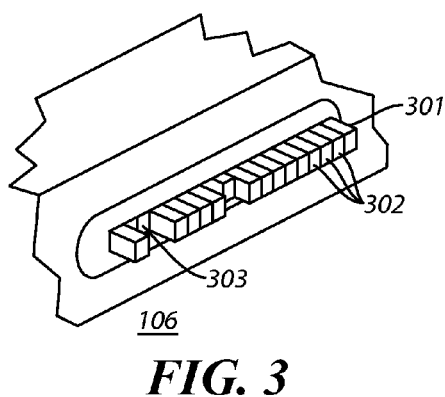
FIG. 3 comprises a perspective schematic detail view as configured in accordance with various embodiments of the invention.

By one approach, and referring momentarily to FIG. 3, this data interface 106 can comprise an adjustable interface that will accommodate a variety of different sockets and hence a variety of different portable cellular-telephony transceivers. Here, for example, the data interface 106 comprises a plurality of linearly-aligned electrical conductors 301. These electrical conductors 301 are initially mechanically biased outwardly (as denoted by reference numeral 302). So configured, these electrical conductors 301 are all available to be inserted into a corresponding socket. When a particular socket has no corresponding mate for a particular one of these electrical conductors 301, however, the socket will push that electrical conductor 301 back against the aforementioned biasing. As an example in these regards, the electrical conductor denoted by reference numeral 303 is shown pushed back in this manner (the socket pushing back in this way, of course, is not shown for the sake of clarity).

By one approach, circuitry within the apparatus 100 can detect which of these electrical conductors 301 are deployed within a given socket and which have been pushed back as described. In such a case this circuitry can, for example, open circuit the electrical conductors 301 that are pushed back to avoid any inappropriate short circuits or other unwanted phenomena.

Figure 4:
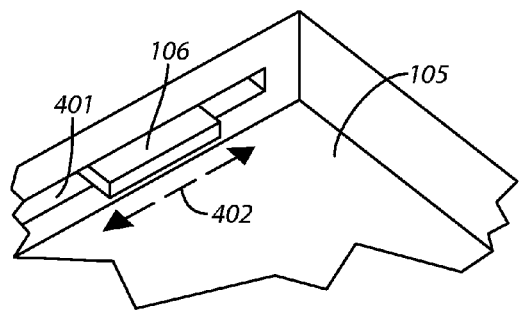
FIG. 4 comprises a perspective schematic detail view as configured in accordance with various embodiments of the invention.

In any event, and regardless of whether the data interface 106 has a dynamic capability as just described or is a statically-configured set of conductive pins or the like, by one approach this data interface 106 can also comprise a physically-adjustable data interface to thereby facilitate locating the data interface in a variety of positions within the basin 105 to thereby accommodate the specific configurations of a particular portable cellular-telephony transceiver. FIG. 4 provides one illustrative example in these regards. Here, the data interface 106 is partially captivated within a slot 401 that nevertheless permits the data interface 106 to be moved back-and-forth linearly as represented by the arrow that is denoted by reference numeral 402.

These teachings will of course accommodate providing more than one such data interface 106 within a given basin 105. In such a case, some of the data interfaces 106 can be statically configured and located while others are dynamically movable and configurable. Or, if desired, all of the data interfaces 106 can be statically configured and located. As yet another example in these regards, all of these data interfaces 106 can be dynamically movable and configurable as desired.

Figure 5:
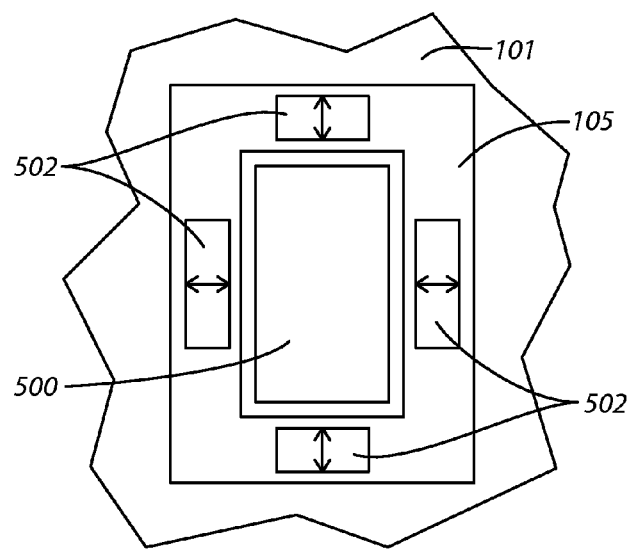
FIG. 5 comprises a top-plan schematic detail view as configured in accordance with various embodiments of the invention.

As mentioned above, if desired, the basin 105 can be configured to adjust to thereby better fit and retain a given portable cellular-telephony transceiver. FIG. 5 provides an illustrative example in these regards. Here, a portable cellular-telephony transceiver 500 having its own integral display (comprising, here, a touch screen display as one might find on an iPhone, a Droid, a Blackberry, or other smartphone of choice) and its own end-user input interface (comprising, here, that same touch screen display) is shown disposed within the basin 105. As shown, the basin 105 is larger than the portable cellular-telephony transceiver 500 and hence will not serve to retain the latter within the basin 105 in a relatively-fixed position.

In this illustrative example, however, the basin 105 further comprises physically-movable elements 502 located parallel to each of the four sides of the basin 105. These elements 502 are each movable inwardly and outwardly with respect to the portable cellular-telephony transceiver 500 as denoted by the small arrowheads. So configured, these elements 502 can be moved inwardly a sufficient distance to contact the portable cellular-telephony transceiver 500 with sufficient force to retain the latter in place within the basin 105.

By one approach these elements 502 can be formed of a rigid material such as a rigid plastic. By another approach, at least the edges that contact the portable cellular-telephony transceiver 500 can be comprised of a compressible material to facilitate holding the portable cellular-telephony transceiver 500 in place while reducing the possibility of marring the portable cellular-telephony transceiver's surfaces.

By one approach these elements 502 can be moved by control of an electro-mechanical servo mechanism of choice. In such a case, if desired, movement of these elements 502 to contact and retain the portable cellular-telephony transceiver can be triggered in response to a sensed condition of choice. By another approach these elements 502 are moved through end-user manipulation (for example, by hand-turning a corresponding threaded member (such as a screw head or a knob) that effects the desired movement).

Figure 6:
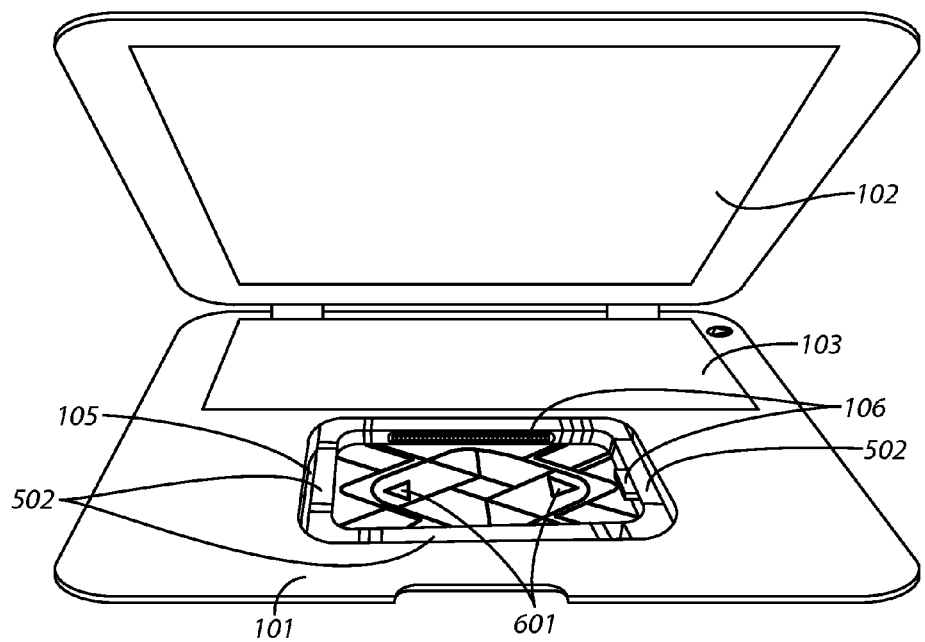
FIG. 6 comprises a perspective detail view as configured in accordance with various embodiments of the invention.

These teachings are highly flexible in these regards and will accommodate a wide variety of different approaches with respect to gripping and retaining a portable cellular-telephony transceiver. FIG. 6 provides but one illustrative example of many in these regards. In this illustrative example finger holes 601 that are accessible from the underside of the housing 101 permit an end user to use their fingers to "open" the gripping elements 502 and in opposition to a inwardly biasing force (not shown) that urges these gripping elements 502 inwardly. The end user can then dispose their portable cellular-telephony transceiver (not shown) within the basin 105 and subsequently remove their fingers from the finger holes 601. This will permit the inwardly biasing force to urge the gripping elements 502 inwardly until they each make contact with the portable cellular-telephony transceiver.

In this case, this approach will inherently tend to centrally locate the portable cellular-telephony transceiver within the basin 105 and hence to a relatively predictable location with respect thereto. The portable cellular-telephony transceiver can then be readily removed as desired by essentially reversing the described process.

Referring again to FIG. 1, and as noted earlier, this apparatus 100 can further comprise any number of other components as desired. This can include, for example, one or more antennas 107 that are disposed within the housing 100 and hence out of view of the end user. By one approach this can comprise at least two antennas that are disposed orthogonally to one another to help to ensure a useful orientation for at least one of the antennas somewhat regardless of how the housing 101 is held or disposed. By one approach this antenna 107 can be operably coupled to a portable cellular-telephony transceiver that is disposed within the basin 105 and can itself be configured to support cellular telephony being carried out by the portable cellular-telephony transceiver. So configured, a portable cellular-telephony transceiver disposed within the basin 105 and otherwise operably coupled to the apparatus 100 can have the benefit of a considerably more capable antenna(s) resource.

This apparatus 100 can also comprise a memory 108. This memory can serve to store, for example, executable instructions for the control circuit 104 and/or the portable cellular-telephony transceiver. This memory can also serve to store, for example, end-user content such as video content, audio content, files of various kinds, and so forth.

This apparatus 100 can also comprise, if desired, its own native wireless interface (or interfaces) 109 that operably couple to the control circuit 104. This can comprise, for example, wide-area network wireless interfaces such as cellular-telephony transceivers, local-area network interfaces (such as 802.11-compatible interfaces or the like), personal-area network interfaces (such as Bluetooth-compatible interfaces or the like), and so forth. So configured, for example, a portable cellular-telephony transceiver that is docked within the basin 105 may be able to effect two-way communications via a wi-fi transceiver capability belonging to the apparatus 100 even when cellular-telephony services are otherwise currently and locally unavailable.

By one approach the apparatus 100 can further optionally comprise one or more renewable energy sources 110. Light-based energy sources, such as a solar-cell array disposed on an exterior surface of the housing 101, can serve in these regards. The electrical power from such a source 110 can serve, for example, to charge a portable power supply for the apparatus 100 (not shown) and/or for the portable cellular-telephony transceiver as desired. By locating such a source 110 on an exterior surface of the housing 101, for example, it can be possible to continue charging the battery of a docked portable cellular-telephony transceiver even when simply carrying the apparatus 101 from one place to another.

These teachings will also accommodate providing one or more audio transducers 111. These can comprise one or more speakers and/or audio amplifiers as desired. By one approach such a speaker can have a fixed location within the housing. By another approach, such a speaker can be deployable into an operating position by swiveling the speaker from a stored location. In any event, such speakers and/or amplifiers can be considerably larger and better sounding than what many portable cellular-telephony transceivers are capable of independently providing. Pursuant to these teachings a docked portable cellular-telephony transceiver can play its native audio content (be that a stored audio file, streaming content being received via cellular telephony, or speaker phone content) via these resources.

As shown in FIG. 1, the apparatus 100 can also optionally include one or more cameras 112. This can comprise a still-image camera and/or a video-image camera. In either case, and again, this camera 112 can be configured to provide captured-image content to a properly docked portable cellular-telephony transceiver. And again, this can greatly expand upon the native abilities of the undocked portable cellular-telephony transceiver. In addition to possibly offering a higher quality camera than the portable cellular-telephony transceiver, for example, this camera 112 can optionally offer automatic panning, zooming, face tracking, and so forth which may not be available, or conveniently deployable, with the portable cellular-telephony transceiver.

And also as shown in FIG. 1, the apparatus 100 can further optionally include one or more microphones 113. Such a microphone can again be configured to serve as an input to a properly docked portable cellular-telephony transceiver. Microphones could also be used, for example, to properly direct the panning/tilting of the aforementioned camera 112 in order to track the speaker.

There are various ways by which such components can be usefully coupled amongst themselves. For the sake of simplicity and illustration but without intending any limitations in these regards, many of these couplings are depicted in FIG. 1 as engaging a bus of sorts. Though useful for many application settings, those skilled in the art will recognize and understand that any number of other architectures and approaches can be accommodated in these regards. As these teachings are not particularly sensitive to any particular choices in these regards, for the sake of brevity further elaboration in these regards are not provided here.

Those skilled in the art will also recognize that such an apparatus 100 can be utilized in conjunction with a docked portable cellular-telephony transceiver in a variety of ways. By one approach, for example, the portable cellular-telephony transceiver can serve as the master of the resources and components of the apparatus 100 (including even, for example, the control circuit 104). By another approach, however, these roles can be essentially reversed. These teachings will also accommodate, for example, a master-master relationship between the apparatus 100 and a docked portable cellular-telephony transceiver if desired. The particular relationship can be statically determined, if desired, or can be the result of a negotiation between the portable cellular-telephony transceiver and the apparatus 100 (which negotiation may, or may not (as desired), include input from the end user).

These teachings can readily facilitate leveraging the capabilities and presence of either the apparatus 100 or the portable cellular-telephony transceiver in favor of the other in any of a wide variety of ways. As one very simple example in these regards, a docked portable cellular-telephony transceiver having its own touch screen can be used as a touch pad-style cursor control for a cursor that is displayed on the apparatus' display.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
   at least a first display;
   an end-user input interface;
   a control circuit operably coupled to both the first display and the end-user input interface;
   a housing that houses the first display, the end-user input interface, and the control circuit, wherein the housing has a basin formed therein of sufficient size to at least substantially fully receive a portable cellular-telephony transceiver having its own display and its own end-user input interface;
   a non-wireless data interface operably coupled to the control circuit and configured to also operably couple to the portable cellular-telephony transceiver to thereby carry data between the control circuit and the portable cellular-telephony transceiver wherein the non-wireless data interface comprises a physically adjustable non-wireless data interface to thereby facilitate being operably coupled to any of a variety of different portable cellular-telephony transceivers; and
   wherein the basin is configured to automatically adjust to snuggly retain the portable cellular-telephony transceiver.

2. The apparatus of claim 1 wherein the housing comprises a housing having a laptop computer form factor.

3. The apparatus of claim 1 wherein the end-user input interface for the apparatus comprises a keyboard.

4. The apparatus of claim 3 wherein the keyboard comprises a virtual keyboard.

5. The apparatus of claim 1 wherein the basin is configured to snuggly receive and retain the portable cellular-telephony.

6. The apparatus of claim 1 wherein the housing comprises a housing having a pad-styled computer form factor.

7. The apparatus of claim 1 further comprising:
a renewable-energy source physically supported by the housing and configured to provide operating power to the portable cellular-telephony transceiver when the portable cellular-telephony transceiver is disposed within the basin.

8. The apparatus of claim 1 wherein the basin is formed on a same side of the housing as the first display.

9. The apparatus of claim 1 wherein the basin is formed on an exterior side of the housing that is opposite the first display.

10. The apparatus of claim 1 wherein the first display comprises a touch-screen display.

11. The apparatus of claim 10 wherein the display of the portable cellular-telephony transceiver serves as a cursor-control end-user interface for a cursor displayed on the first display.

12. The apparatus of claim 1 further comprising:
at least one audio transducer physically supported by the housing.

13. The apparatus of claim 12 wherein the audio transducer is configured to render audio content sourced by the portable cellular-telephony transceiver.

14. The apparatus of claim 1 further comprising:
at least one cellular-telephony antenna disposed within the housing and configured to support cellular telephony carried out by the portable cellular-telephony transceiver.

15. The apparatus of claim 1 further comprising:
at least one camera disposed within the housing and configured to provide captured-image content to the portable cellular-telephony transceiver.

16. The apparatus of claim 1 further comprising:
at least one microphone disposed within the housing and configured to provide audio content to the portable cellular-telephony transceiver.

* * * * *